United States Patent
Faulkner et al.

(10) Patent No.: US 6,221,329 B1
(45) Date of Patent: Apr. 24, 2001

(54) PYROLYSIS PROCESS FOR RECLAIMING DESIRABLE MATERIALS FROM VEHICLE TIRES

(75) Inventors: Bobby P. Faulkner, New Berlin; Robert J. Unterweger, Nashotah; Roy W. Hansen, Caledonia, all of WI (US)

(73) Assignee: Svedala Industries, Inc., Waukesha, WI (US)

( * ) Notice: Subject to any disclaimer, the term of this patent is extended or adjusted under 35 U.S.C. 154(b) by 0 days.

(21) Appl. No.: 09/264,948

(22) Filed: Mar. 9, 1999

(51) Int. Cl.⁷ .............................. F23G 5/00; F23K 3/00; C10B 1/10

(52) U.S. Cl. .................................. 423/445 R; 423/449.1; 423/449.6; 423/449.7; 110/267; 110/268; 110/275; 110/276; 110/278

(58) Field of Search ...................................... 423/481, 488, 423/449.6, 449.7, 445 R, 449.1; 585/241, 240; 201/28, 33, 25, 32; 222/519; 110/276, 275, 278, 267, 268; 198/658, 618, 657

(56) References Cited

U.S. PATENT DOCUMENTS

| | | | |
|---|---|---|---|
| 4,038,100 | * 7/1977 | Haberman | 106/307 |
| 4,084,521 | 4/1978 | Herbold et al. | 110/242 |
| 4,210,491 | * 7/1980 | Schulman | 201/2.5 |
| 4,222,502 | * 9/1980 | Gubitose et al. | 222/240 |
| 4,250,158 | 2/1981 | Solbakken et al. | 423/449 |
| 4,255,129 | 3/1981 | Reed et al. | 432/13 |
| 4,284,616 | 8/1981 | Solbakken et al. | 423/461 |
| 4,463,203 | 7/1984 | Gi | 585/241 |
| 4,648,328 | 3/1987 | Keough | 110/229 |
| 4,740,270 | 4/1988 | Roy | 201/35 |
| 4,900,401 | 2/1990 | Horton | 202/117 |
| 5,057,189 | 10/1991 | Apffel | 202/113 |
| 5,091,077 | 2/1992 | Williams | 209/10 |
| 5,095,040 | 3/1992 | Ledford | 521/40.5 |
| 5,411,714 | 5/1995 | Wu et al. | 422/232 |
| 5,423,950 | 6/1995 | Avetisian et al. | 201/3 |
| 5,437,237 | 8/1995 | Digre | 110/346 |
| 5,506,274 | 4/1996 | Brown | 521/41 |
| 5,728,361 | 3/1998 | Holley | 423/449.6 |

FOREIGN PATENT DOCUMENTS

| | | |
|---|---|---|
| 196 17 450 | 11/1997 | (DE) . |
| 0 041 186 | 12/1981 | (EP) . |
| WO 94/02781 | 2/1994 | (WO) . |
| WO 99/50374 | 10/1999 | (WO) . |

\* cited by examiner

*Primary Examiner*—Steven P. Griffin
*Assistant Examiner*—Eileen E. Nave
(74) *Attorney, Agent, or Firm*—Andrus, Sceales, Starke & Sawall, LLP (57) ABSTRACT

A process and system for the recovery of desirable constituent materials from vehicle tire pieces through pyrolysis. The system includes a pyrolysis section that is divided into a plurality of individual heating zones. Each of the heating zones is heated to a distinct operating temperature that is independent from the operating temperature of the remaining heating zones. Vehicle tire pieces are fed into the infeed end of the pyrolysis section by a rotatable feed cylinder that includes a screw-like flight extending from the inner wall of the feed cylinder. As the feed cylinder rotates, the flight directs the supply of vehicle tire pieces into the infeed end of the pyrolysis section. The pyrolysis section includes a rotary kiln that is divided into the plurality of heating zones. The vehicle tire pieces are fed through the plurality of heating zones in the rotary kiln from the infeed end of the rotary kiln to the discharge end of the rotary kiln, such that the tire pieces are pyrolyzed as they traverse the rotary kiln. A rotatable trommel is coupled to the discharge end of the rotary kiln to separate the pyrolyzed tire pieces into their constituent desirable materials.

24 Claims, 5 Drawing Sheets

PYROLYSIS PROCESS FOR RECLAIMING DESIRABLE MATERIALS FROM VEHICLE TIRES

BACKGROUND OF THE INVENTION

The present invention relates generally to the production of carbon black through pyrolytic distillation of scrap tires. More specifically, the present invention relates to a used tire pyrolysis system and method that incorporates a novel feed tube and zoned heating of tire scrap material to extract carbon black, scrap steel, heating oil and gas.

As the supply of available landfill space decreases, environmentally sensitive disposal of consumed vehicle tires is become an ever-increasing problem. In the U.S. alone, over 280 million vehicle tires are scrapped and shipped to landfills each year. Although some of the used vehicle tires are recycled to be used in pavement and others are burned as boiler fuel, more than 80% of used vehicle tires end up being deposited in landfills. Discarding spent vehicle tires in landfills has been recognized as a significant waste of recyclable resources. For many years it has been known that used vehicle tires can be recycled by pyrolysis to obtain valuable by-products that can be sold and reused. Pyrolysis, generally speaking, is a thermal distillation or decomposition of a substance. In the case of used vehicle tires, this process is carried out in the absence of oxygen and at temperatures generally between 500° C. and 800° C.

The process of recycling used tires by pyrolysis allows the recovery of substantial amounts of oil, gas, carbon black and scrap steel. In particular, it is expected that using the apparatus described herein, it will be possible to recover approximately 35 tons of carbon black and 10 tons of scrap steel from 100 tons of shredded vehicle tires.

Although many machines have been designed to recycle used tires through pyrolysis, none have been entirely successful. One problem with many previous machines involves the presence of particulate matter in the gas that is evolved from the tires. Particulate matter—primary carbon dust and glass fiber, accumulates in fittings, vents and flame arrestors, which can obstruct passages and create substantial danger of explosion.

Another of the difficulties of the present methods to recycle used tires through pyrolysis is that the solid carbon product, carbon black, obtained is outside of the specification for most commercial grade carbon black and is therefore not commercially usable. Thus, in order to produce commercial grade carbon black it is necessary to invest thermal energy to the recovered oil obtained through pyrolysis. As can be understood, it would be much more energy efficient to directly recover a commercial grade carbon black through the pyrolysis of used vehicle tires.

Another drawback to known pyrolysis machines involves oil contamination in the carbon black which destroys the commercial value thereof. In order to produce high quality carbon black, virtually all oil must be removed. In known pyrolysis machines, the oil vapor released from the pyrolyzed material is drawn, at least partially, through or past the carbon black product, thus contaminating it with oil residue.

Handling the shredded tire pieces has also presented substantial challenges in known pyrolysis systems. The residual steel strands and natural stickiness of the heated rubber combine to make transporting the shredded tires to be pyrolyzed a significant challenge. For example, many known methods utilize a rotating screw to feed the shredded tires into a kiln in which the pyrolysis process occurs. Due to the inherent properties of the shredded tires, the persistent problem with known machines is "baling-up" of the shredded tires within the screw conveyor leading to jamming of the screw auger used to convey them Therefore, it is an object of the present invention to provide a pyrolysis system that efficiently and effectively feeds shredded vehicle tires into a rotary kiln in which the pyrolysis process occurs. It is an additional object of the present invention to operate the process of the pyrolysis system in a separate zoned manner to most efficiently process the vehicle tires. It is another object of the invention to operate the process in separate zoned areas, each of which operates at a distinct temperature to maximize the efficiency of the pyrolysis process. It is a further object of the invention to efficiently separate the recovered carbon black from the scrap steel at the end of the rotary kiln. Further, it is an object of the present invention to evacuate the oil-containing producer gas from within the rotary kiln at a position spaced from the discharge end of the rotary kiln to prevent contamination of the carbon black.

SUMMARY OF THE INVENTION

The present invention is a processing system for the reclamation and recovery of desirable materials from shredded vehicle tires through pyrolysis. The process of the present invention involves initially receiving a supply of shredded vehicle tires in a feed chamber. The feed chamber generally includes a double-dumping arrangement to provide an air interlock to prevent air from entering into the feed chamber.

The feed chamber in turn is coupled to a first end of an infeed device that is positioned to transport the supply of vehicle tire pieces from the feed chamber. In the preferred embodiment of the invention, the infeed device is a rotatable feed cylinder that extends between a first end and a second end. The rotatable feed cylinder is defined by a generally cylindrical shell that extends between the first end and the second end. The feed cylinder includes a flight formed along the inner surface of the shell of the feed cylinder. The flight formed within the feed cylinder extends from the first end of the feed cylinder to the second end of the feed cylinder. The flight extends radially inward from the inner surface of the shell and forms a screw-like pattern from the first end of the feed cylinder to the second end of the feed cylinder. When the feed cylinder is rotated, the flight formed along the inner surface of the feed cylinder directs the tire pieces from the feed chamber coupled to the first end of the feed cylinder to the second end of the feed cylinder.

The second end of the feed cylinder, in turn, is coupled to a pyrolysis section in which the vehicle tire pieces are pyrolyzed into their constituent material, such as char and steel wire scrap. The pyrolysis section is generally devoid of oxygen to facilitate the pyrolysis process within the pyrolysis section. The pyrolysis section includes a rotary kiln having an infeed end and a discharge end. The infeed end of the rotary kiln is elevated relative to the discharge end such that the rotation and incline of the rotary kiln combine to transport the tire pieces through the rotary kiln. The infeed end of the rotary kiln is coupled to the second end of the feed cylinder to receive the supply of vehicle tire pieces from the feed cylinder. Preferably, the rotary kiln and the feed cylinder are joined to rotate together.

The rotary kiln in the pyrolysis section is divided into a plurality of individual heating zones. Each of the individual heating zones formed within the rotary kiln is heated to a distinct operating temperature that is independent of the operating temperatures of the other heating zones. Thus, as the rotary kiln rotates, the vehicle tire pieces are transferred between the heating zones from the infeed end to the discharge end of the rotary kiln. As the tire pieces traverse the rotary kiln, the tire pieces are pyrolyzed.

In one feature of the present invention, the rotary kiln is divided into three separate, distinct heating zones that each operate at a different operating temperature. Preferably, the operating temperatures of the heating zones decrease from the infeed end of the rotary kiln to the discharge end of the rotary kiln. In a preferred embodiment of the invention, the operating temperature of the first heating zone nearest to the infeed end of the rotary kiln is between 700° C. to 800° C. The operating temperature of the second heating zone positioned adjacent to the first feeding zone is preferably between 600° C. to 700° C., while the operating temperature of the third heating zone positioned closest to the discharge end of the rotary kiln is between 500° C. to 600° C.

In another feature of the invention, each of the individual heating zones is heated by a separate burner assembly. Each of the burner assemblies is independently controlled such that the burner assemblies can be operated to heat the individual heating zones to their respective operating temperatures.

After being pyrolyzed, the vehicle tire pieces leave the discharge end of the rotary kiln and are received within a rotatable trommel positioned adjacent to the discharge end of the rotary kiln. The rotatable trommel includes a generally cylindrical outer shell that has a plurality of slots formed along the inner surface of the outer shell. Each of the slots formed in the outer shell is preferably sized to permit passage of a first desirable material, char, while preventing the passage of a second desirable material, steel wire scrap. A trajectory diverter is positioned adjacent to each slot formed in the trommel such that as the trommel rotates, the trajectory diverter diverts the second desirable material, scrap steel, away from the slot positioned adjacent thereto to prevent clogging of the slot.

As the pyrolyzed vehicle tire pieces pass through the rotatable trommel, the smaller char particles are removed through the slots, while the steel wire scrap passes through the trommel and is discharged at the discharge end of the trommel. The removed char and steel wire scrap are separated into different locations and can be further processed downstream from the system of the present invention.

In another feature of the invention, a discharge tube is positioned to extend into the open interior of the rotary kiln from the discharge end of the rotary kiln. The discharge tube is defined by a first end that is positioned within the rotary kiln, preferably near the second heating zone defined within the rotary kiln. The second end of the discharge tube is preferably connected to a supply of negative pressure, such that the negative pressure draws the gases that are released during the pyrolysis of the vehicle tire pieces out of the rotary kiln. The gases removed from within the rotary kiln can then be processed downstream to remove oil and other desirable materials that are expelled from the vehicle tire pieces during the pyrolysis process. The discharge tube that withdraws gases from within the interior of the rotary kiln functions to reduce the contamination of the discharged gases as well as preventing the oil entrained within the gas from cooling and condensing within the separating section near the discharge end of the rotary kiln.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
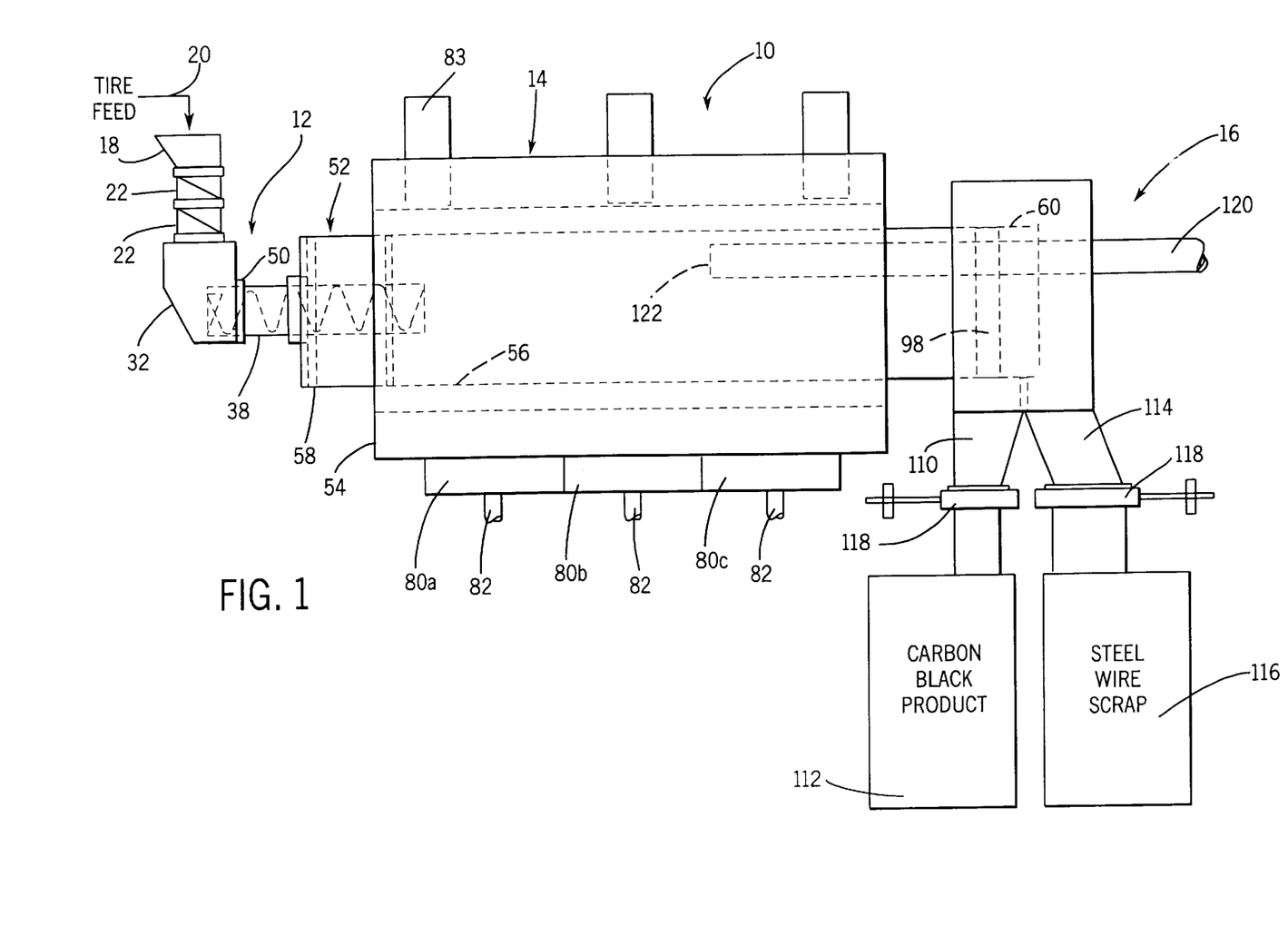
FIG. 1 is a schematic illustration of a pyrolysis system of the present invention for the reclamation and recovery of desirable materials from shredded vehicle tires.

FIG. 1 generally illustrates the pyrolysis system 10 of the present invention. The pyrolysis system 10 operates to receive a supply of shredded vehicle tires, and through pyrolysis, convert the shredded vehicle tires into desirable materials, such as char containing carbon black, steel wire scrap and oil-containing gases.

The pyrolysis system 10 generally includes an infeed section 12, a pyrolysis section 14 and a separating section 16. The vehicle tire pieces are initially fed into the infeed section 12 which includes a transporting system that feeds the vehicle tire pieces into the pyrolysis section 14. As the vehicle tire pieces move through the pyrolysis section 14, lower weight hydrocarbons contained within the vehicle tire pieces are driven off as gases. The remaining portions of the vehicle tires after pyrolysis are desirable materials such as char and steel wire scrap. Upon leaving the pyrolysis section, the remaining portions of the vehicle tire pieces are fed into the separating section 16, where the desirable materials are separated into distinct piles of the desirable materials. After separation, these desirable materials can then be processed downstream from the pyrolysis system 10 in accordance with known practices and eventually sold or reused.

Figure 2:
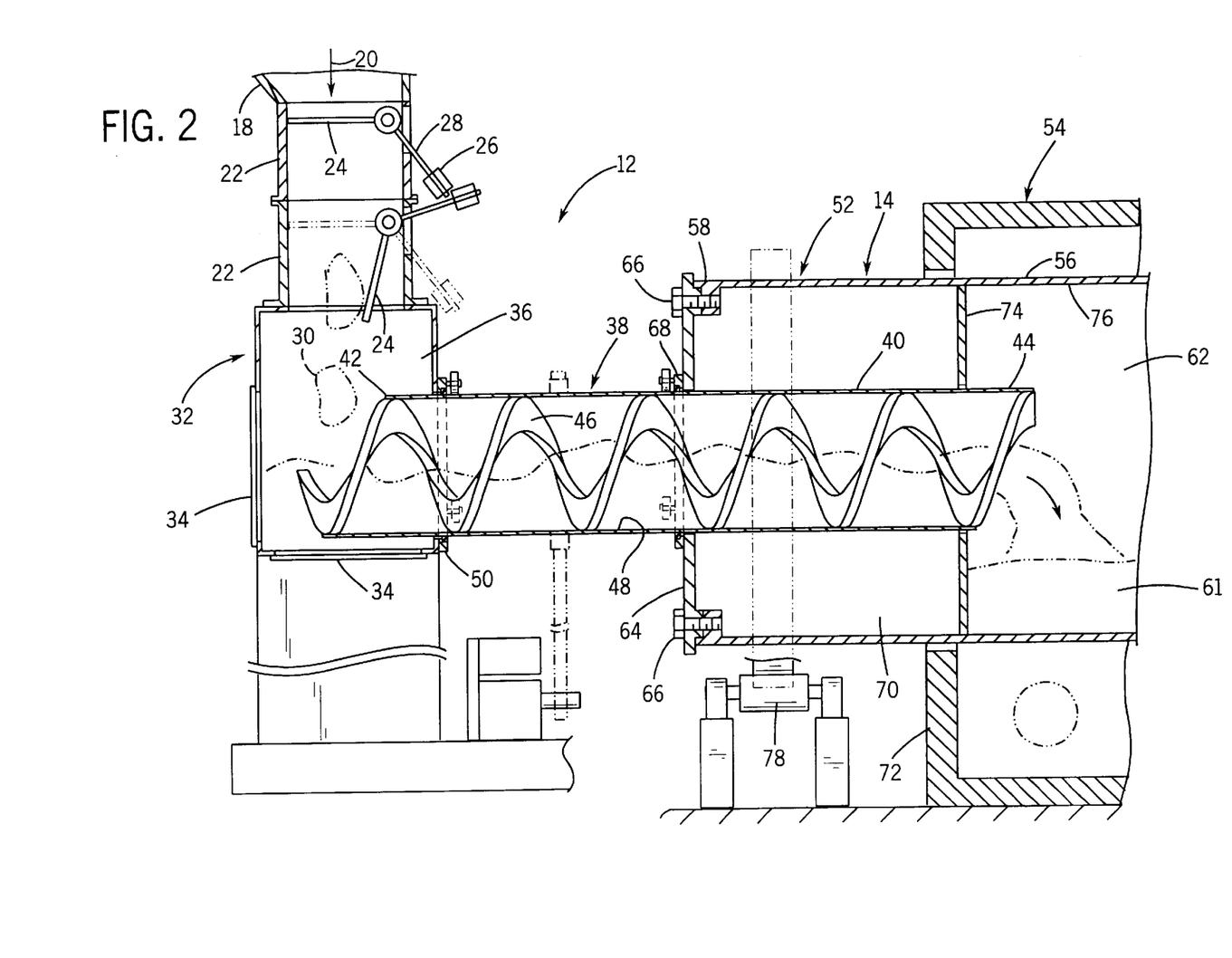
FIG. 2 is a partial section view of the infeed section and the infeed end of the pyrolysis section of the pyrolysis system of the present invention.

Referring now to FIG. 2, the vehicle tire pieces are initially fed into a hopper 18, as illustrated by arrow 20. In the preferred embodiment of the invention, the vehicle tire pieces can be formed either upstream from the hopper 18 by conventional shredding techniques or can be shipped from a remote tire shredding facility. Specifically, used vehicle tires are shredded into individual pieces each having a maximum size of approximately 4 inches. The vehicle tire pieces are fed by conventional conveyor techniques to the intake end of the hopper 18.

Since the pyrolysis reaction that takes place within the pyrolysis section 14 must occur in the absence of air, a pair of dump valves 22 that function as an air interlock are positioned within the hopper 18. Each of the dump valves 22 includes a pivotable gate 24 mounted for rotation between a closed position and an open position within the generally open interior of the hopper 18. Each of the gates 24 interacts with the inside wall of the dump valve 22 to create a generally air-tight seal within the hopper 18. A balance weight 26 is connected to rod 28 to bias the gates 24 into their closed position, as shown in the upper dump valve 22.

Initially, both gates 24 of the dump valves 22 are closed and a supply of vehicle tire pieces, as shown in phantom by reference numeral 30, are deposited onto the closed gate 24 of the upper dump valve 22. The gate 24 of the upper dump valve 22 is then pivoted downward to allow the vehicle tire pieces to fall onto the closed gate 24 of the lower dump valve 22. With the vehicle tire pieces supported on the gate 24 of the lower dump valve 22, the gate 24 of the upper dump valve 22 again returns to the closed position to generally seal the hopper 18 from atmosphere. Once the gate 24 of the upper dump valve 22 closes, the gate 24 of the lower dump valve 22 opens to allow the vehicle tire pieces 30 to fall into a feed chamber 32. This process is continuously repeated to feed the supply of vehicle tire pieces into the feed chamber 32 such that the pair of dump valves 22 form an air interlock to limit the amount of air that enters into the feed chamber 32 along with the vehicle tire pieces 30.

The feed chamber 32 is sized to store a supply of vehicle tire pieces as the tire pieces pass through the dump valves 22 of the hopper 18. The feed chamber 32 includes a pair of access panels 34 and defines an open interior 36 that holds the supply of vehicle tire pieces. Although not shown in FIG. 2, a supply of nitrogen is coupled to the feed chamber 32 to evacuate any air contained within the feed chamber 32 and the remaining components of the pyrolysis system 10 coupled thereto. The supply of nitrogen replaces any air present within the pyrolysis system 10 and is an inert gas that does not affect the pyrolysis reaction taking place within the pyrolysis system 10.

As shown in FIG. 2, the infeed section 12 further includes a rotatable feed cylinder 38 that extends between the feed chamber 32 and the pyrolysis section 14. The feed cylinder 38 is defined by a cylindrical shell 40 extending between a first end 42 and a second end 44. The feed cylinder 38 includes an internal flight 46 that extends in a screw-like pattern from the first end 42 to the second end 44. The flight 46 extends radially inward from an inner wall surface 48 of the shell 40 and has a radial height less than the radius of the shell 40. In the preferred embodiment of the invention, the outer diameter of the shell 40 is approximately 38 inches, while the flight 46 extends radially inward approximately 13 inches from the inner wall surface 48.

The feed cylinder 38 is rotatable about its longitudinal axis and the flight 46 formed within the feed cylinder 38 acts as an Archimedes screw to transport the supply of vehicle tire pieces from the first end 42 to the second end 44 of the feed cylinder 38. Since the flight 46 extends radially inward from the inner wall surface 48, binding of the vehicle tire pieces within the feed cylinder 38 is virtually eliminated as the vehicle tire pieces are moved from the first end 42 to the second end 44. In the preferred embodiment of the invention, the screw pitch for flight 46 is approximately 38 inches such that sufficient product flow is created between the feed chamber 32 and the pyrolysis section 14.

As can be seen in FIG. 2, the first end 42 of the feed cylinder 38 is defined by the shape of flight 46. In this manner, the first end 42 of the feed cylinder 38 forms a scoop that pulls the vehicle tire pieces from within the open interior 36 of the feed chamber 32 as the feed cylinder 38 rotates.

A sealing arrangement 50 is positioned around the feed cylinder 38 at the location where the feed cylinder 38 enters into the feed chamber 32. Since the feed cylinder 38 rotates relative to the stationary feed chamber 32, the sealing arrangement 50 prevents air from entering into the pyrolysis system at the junction between the feed cylinder 38 and the feed chamber 32.

Referring now to FIGS. 1 and/or 2, the pyrolysis section 14 generally includes a rotary kiln 52 that extends through an insulated furnace 54. The rotary kiln 52 includes a generally cylindrical shell 56 that extends between an infeed end 58 and a discharge end 60. The rotary kiln 52 is rotatable about its longitudinal axis and is inclined such that the infeed end 58 is positioned vertically above the discharge end 60 to urge the vehicle tire piece product flow 61 to traverse the rotary kiln 52 from the infeed end 58 to the discharge end 60.

As can be seen in FIG. 2, the feed cylinder 38 extends through the infeed end 58 of the rotary kiln 52 and into open interior 62 defined by the shell 56. Specifically, the feed cylinder 38 extends through an end plate 64 that is removably attached to the infeed end 58 of the rotary kiln 52 by a pair of connectors 66. A sealing arrangement 68 surrounds the feed cylinder 38 to provide an air-tight seal between the rotary kiln 52 and the feed cylinder 38 to prevent air from entering into the pyrolysis system.

The infeed end 58 of the rotary kiln 52 includes a hollow, unheated extended portion 70 that extends longitudinally outward past the insulated outer wall 72 of the furnace 54. The extended portion 70 is defined at one end by the end plate 64 and at an opposed end by an internal dam 74 that extends radially between the inner wall surface 76 of the shell 56 of the rotary kiln 52. As can be seen in FIG. 2, the vehicle tire pieces transported by the rotating feed cylinder 38 are deposited into the open interior 62 of the rotary kiln 52 downstream from the internal dam 74. In the preferred embodiment of the invention, the shell 40 of the feed cylinder 38 near the second end 44 is securely fixed to the internal dam 74 such that the feed cylinder 38 rotates in concert with the rotation of the rotary kiln 52.

In the preferred embodiment of the invention, a drive mechanism 78 is coupled to the rotary kiln 52 near the infeed end 58 to effect rotation of both the rotary kiln 52 and the feed cylinder 38. The speed of rotation of the rotary kiln 52 in part determines the amount of time required for the product flow 61 to traverse the rotary kiln 52 from the infeed end 58 to the discharge end 60. As can be easily understood, faster rotation of the rotary kiln 52 causes the product flow 61 to move more quickly from the infeed end 58 to the discharge end 60, while reduced rotational speeds increase the amount of time the product flow 61 remain within the rotary kiln 52.

Referring now to FIG. 1, the furnace 54 surrounds a portion of the rotary kiln 52 and includes a plurality of individual burner assemblies 80a–80c that operate to heat the outer shell 56 of the rotary kiln 52. Each of the individual burner assemblies 80a–c is independently operable such that each individual burner assembly 80a–c can heat a different portion of the shell 56 of the rotary kiln 52 to a distinct operating temperature. In this manner, the plurality of burner assemblies 80a–c create a plurality of individual heating zones along the longitudinal length of the rotary kiln 52. Each of the individual burner assemblies 80a–c is fed by a separate source of fuel through a supply pipe 82. In the preferred embodiment of the invention, each of the burner assemblies 80a–c is fed with a supply of natural gas through its associated supply pipe 82. Although not shown in the figure, a control arrangement is coupled to each of the burner assemblies 80a–c and an array of temperature sensors to monitor and control the operation of the respective burner assemblies 80a–c to maintain each of the heating zones at the desired operating temperature.

Each of the burner assemblies 80a–c is positioned below the shell 56 of the rotary kiln 52 to heat the shell 56 as the shell rotates within the furnace 54. The heat generated by each of the burner assemblies 80a–80c, in turn, is transferred through the shell 56 to the vehicle tire pieces being transported through the rotary kiln 52 from the infeed end 58 to the discharge end 60. A series of exhaust discharge pipes 83 extend into the furnace to remove the exhaust generated by the burner assemblies 80a–c.

In the preferred embodiment of the invention, each of the heating zones is heated to a distinct operating temperature that is different from the operating temperature of the remaining heating zones. In the preferred embodiment of the invention, the operating temperatures of the heating zones formed along the longitudinal length of the rotary kiln 52 decrease from the infeed end 58 to the discharge end 60. The varying operating temperatures along the longitudinal length of the rotary kiln 52 allow the product flow 61 consisting of the vehicle tire pieces passing through the rotary kiln 52 to be more efficiently pyrolyzed to create commercially desirable end products at the discharge end 60 of the rotary kiln 52.

As the product flow 61, including the vehicle tire pieces, enter into the open interior 62 of the rotary kiln 52, the product flow 61 is heated at a first operating temperature by the burner assembly 80a positioned nearest to the infeed end 58 of the rotary kiln 52. In the preferred embodiment of the invention, the first burner assembly 80a operates to maintain the first heating zone of the rotary kiln 52 at an operating temperature of between 700° C. to 800° C. More specifically, it has been found that an optimal operating temperature for the first heating zone is between 700° C. to 750° C. When the vehicle tire pieces travel through the first heating zone, the high operating temperature causes the vehicle tire pieces to be rapidly heated, which promotes cracking and vaporizes the light hydrocarbon fractions contained within the vehicle tire pieces. The vaporized hydrocarbon fractions are released as discharge gases into the open interior 62 of the rotary kiln 52.

After passing through the first heating zone within the rotary kiln 52, the product flow 61 enters into a second heating zone that has a second operating temperature controlled by the burner assembly 80b. The operating temperature of the second heating zone is less than the operating temperature of the first heating zone, but is relatively high to continue the pyrolysis reaction within the rotary kiln 52. In the preferred embodiment of the invention, the second operating temperature is between 600° C. to 700° C., with an optimal temperature of approximately 600° C. While the vehicle tire pieces of the product flow 61 are in the second heating zone, the second operating temperature continues to drive the light volatiles from the vehicle tire pieces and release discharge gases into the open interior 62 of the rotary kiln 52.

After passing through the second heating zone, the vehicle tire pieces of the product flow 61 enter into a third heating zone having a third operating temperature controlled by the burner assembly 80c. In the preferred embodiment of the invention, the third operating temperature is less than the second operating temperature. Preferably, the third operating temperature of the third heating zone is between 500° C. to 600°C., with an optimum temperature of approximately 500° C. While the vehicle tire pieces are in the third heating zone, the temperature of the tire pieces near the operating temperature of the third heating zone to continue to drive off the volatiles from the vehicle tire pieces. After the vehicle tire pieces pass through the third heating zone and exit the furnace 54, the product flow 61 contains only about 1% volatiles, the remaining volatiles having been driven off during the pyrolysis process within the rotary kiln 52.

Figure 3:
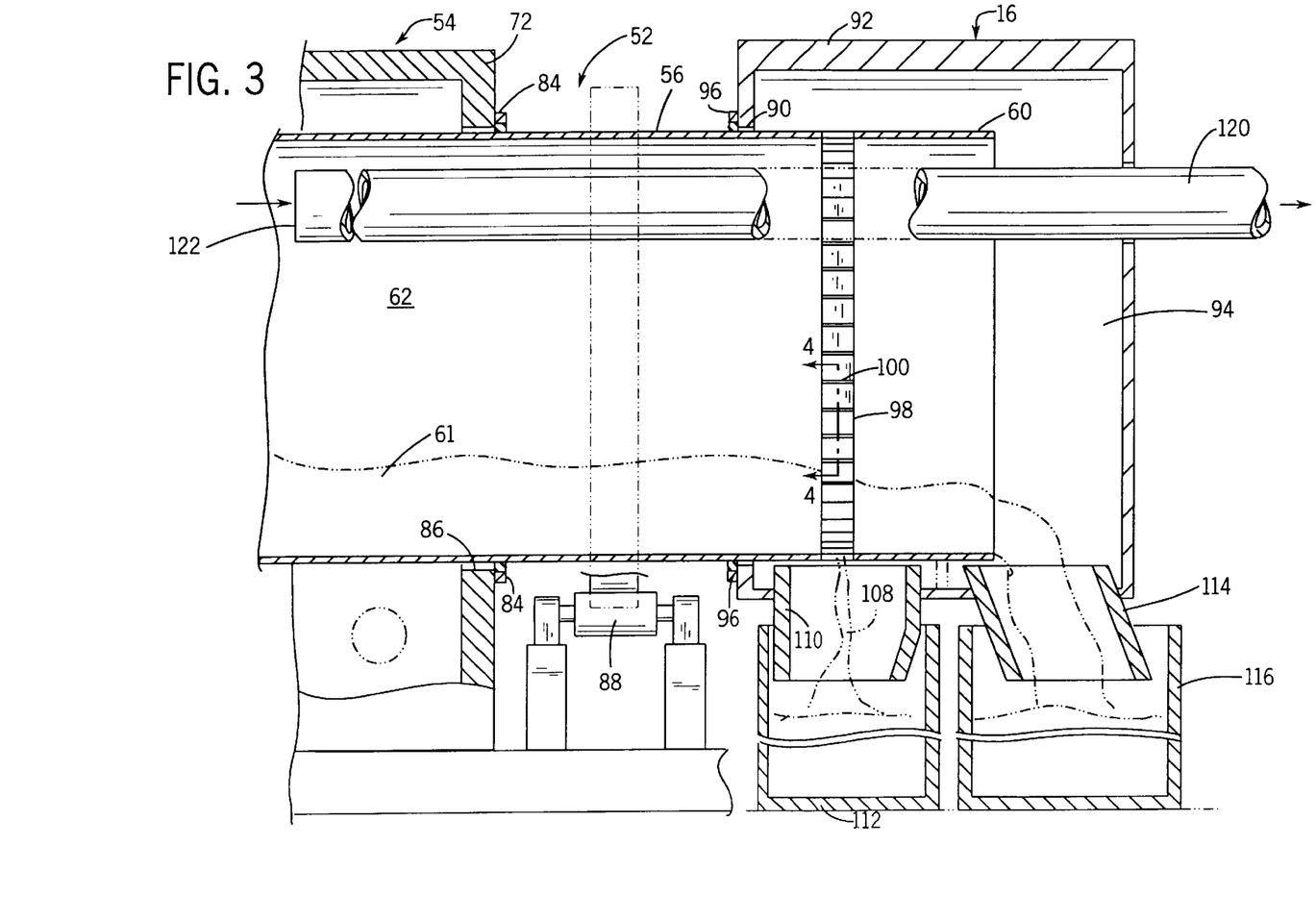
FIG. 3 is a partial section view of the discharge end of the pyrolysis section including a rotatable trommel that separates the desirable materials from the pyrolyzed vehicle tires.

Referring now to FIG. 3, the discharge end 60 of the rotary kiln 52 extends past the outer wall 72 of the furnace 54. A sealing arrangement 84 provides an air-tight seal between the rotatable shell 56 of the rotary kiln 52 and an opening 86 formed in the stationary outer wall 72. A second drive member 88 is coupled to the shell 56 of the rotary kiln 52 to effect rotation of the rotary kiln 52 about its longitudinal axis.

The discharge end 60 of the rotary kiln 52 extends from the furnace 54 and enters into the separating section 16, as shown in FIGS. 1 and 3. Specifically, the discharge end 60 extends through an opening 90 formed in a hood 92 that defines a generally open interior 94. A sealing arrangement 96 surrounds the shell 56 of the rotary kiln 52 to provide an air-tight seal for the opening 90 formed in the hood 92 to prevent air from entering into the open interior 94.

The rotary kiln 52 includes a trommel 98 formed along its outer circumference and positioned axially inward from the discharge end 60. The trommel 98 functions to separate the desirable materials that remain after the tire pieces are pyrolyzed within the plurality of heating zones defined along the portion of the rotary kiln 52 contained within the furnace 54. Specifically, the vehicle tire pieces are pyrolyzed into a char material and steel wire scrap. Trommel 98 functions to separate the char material from the steel wire scrap, each of which are desirable materials recovered from the vehicle tire pieces.

Figure 4:
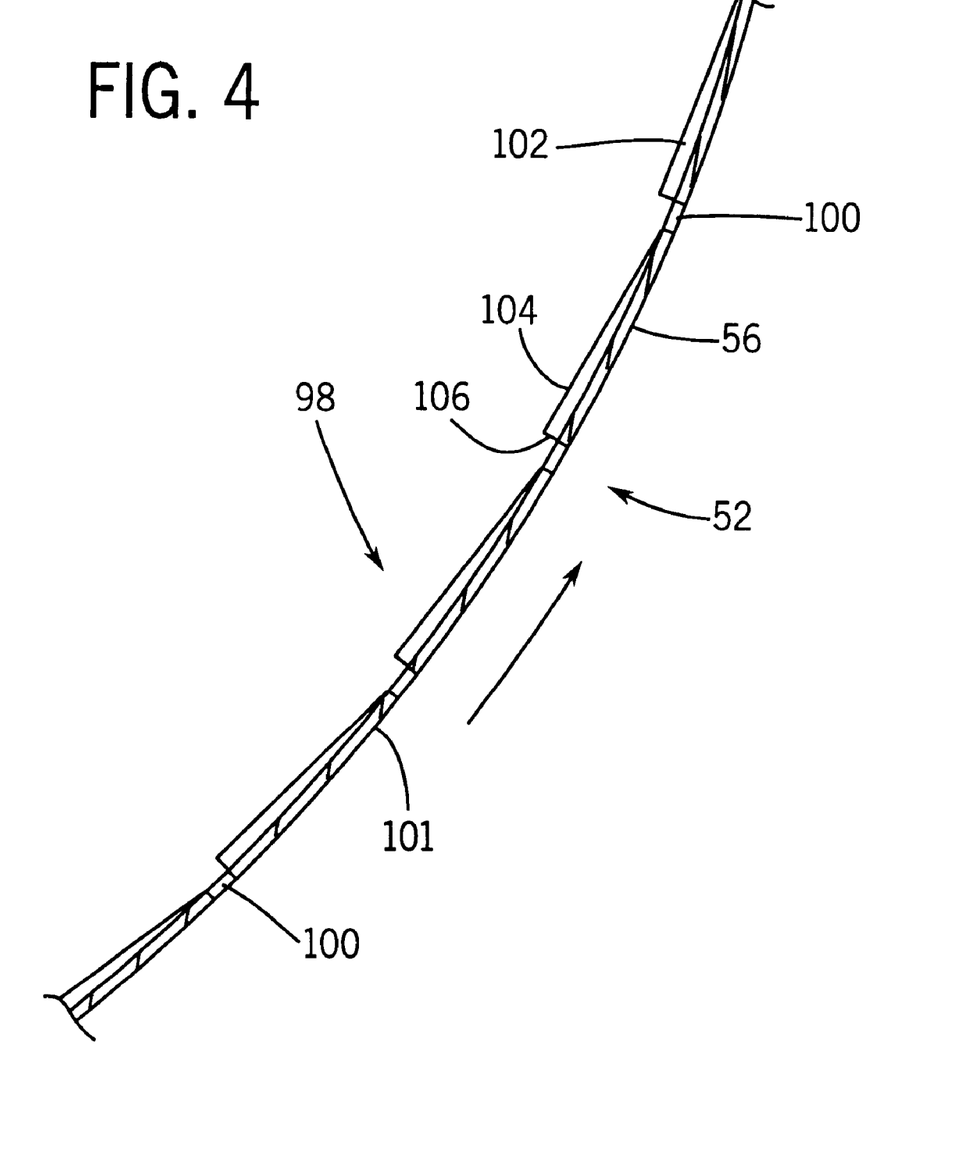
FIG. 4 is a partial section view taken along line 4—4 in FIG. 3 illustrating a series of slots and trajectory diverters formed on the trommel to separate the desirable materials.

Referring now to FIG. 4, the trommel 98 generally has a plurality of open slots 100 circumferentially spaced along a cylindrical shell 101 of the trommel 98. Preferably, the trommel 98 is formed as part of the shell 56 of the rotary kiln 52 and thus has the same outer circumference as the rotary kiln 52. The slots 100 are sized to permit char to pass therethrough while being small enough to prevent a substantial amount of the steel wire scrap from passing therethrough.

To further promote the separation of char from the steel wire scrap, a trajectory diverter ramp 102 is positioned adjacent to each of the slots 100 formed in the outer circumference of the trommel 98. The trajectory diverter ramps 102 act to divert the steel wire scrap away from the slots 100 to prevent clogging while allowing the char particles to pass through the slots 100. As can be seen in FIG. 4, each trajectory diverter ramp 102 includes an inclined ramp surface 104 that extends away from the shell 101 and terminates at a trailing edge 106 positioned adjacent to the slot 100. The ramp surface 104 directs the steel wire scrap away from the open slot 100 to prevent clogging of the slots 100.

Referring again to FIG. 3, the char 108 separated from the product flow 61 by the trommel 98 passes through the slots 100 in the trommel 98 and into a char chute 110. The char chute 110 directs the removed char 108 into a collection bin 112. The separated char contained within the collection bin 112 can then be processed downstream by conventional processing techniques to produce a commercial grade carbon black that can then be utilized for known functions.

The steel wire scrap that remains in the product flow 61 downstream from the trommel 98 flows out of the discharge end 60 of the rotary kiln 52. The steel wire scrap leaving the discharge end 60 passes through a steel chute 114 and into a collection bin 116. The steel wire scrap collected in the collection bin 116 is then processed downstream and sold as a desirable product for use in conventional applications, such as in the production of new vehicle tires.

Although the slots 100 in the trommel 98 function to prevent a substantial portion of the steel wire scrap from passing therethrough, a small percent of the steel wire scrap passes through the slots 100 in the trommel 98 and is thus contained in the material within the collection bin 112. For this reason, the char material within the collection bin 112 is typically passed through a magnetic separation circuit downstream from the collection bin to remove the steel wire scrap material found therein. The removed steel wire scrap material is then combined with the steel wire scrap material within the collection bin 116 and sold as discussed above.

Referring back to FIG. 1, a pair of isolation gates 118 are positioned between the collection bins 112, 116 and the respective char chute 110 and steel chute 114. The isolation gates prevent air from entering into the pyrolysis system 10 as the char 108 and steel wire scrap are discharged into their respective collection bins 112, 116. In addition to isolating the collection bins 112, 116, the isolation gates are connected to a supply of nitrogen to flush the pyrolysis system 10 of any air that may enter into the system.

Referring now to FIGS. 1 and 3, a gas discharge pipe 120 extends into the generally open interior 62 of the rotary kiln 52 to remove gases expelled during the pyrolysis process. Specifically, a first end 122 of the gas discharge pipe extends axially inward from the discharge end 60 of the rotary kiln 52 and is positioned generally in an area corresponding to the second heating zone of the rotary kiln 52. The discharge pipe 120 extends through the outer wall of hood 92 and is connected to a source of negative pressure (not shown). The source of negative pressure acts to draw expelled gases out from the open interior 62 of the rotary kiln 52. Since the expelled gases are withdrawn prior to the separating section 16, the extracted gases contain far less airborne contaminants than pyrolysis systems that extract the gases from within the hood 92 of the separating section 16. Additionally, since the gases are extracted at elevated temperatures, the oil contained within the gases does not separate and coat the interior structure of the separating section 16 as was the case in prior pyrolysis systems. The gases removed by the discharge pipe 120 are then subject to downstream processing in manners that are well known. For example, extracted gases can be cooled and the oil particles withdrawn to create a supply of oil that is commercially desirable. Further, the gases can be scrubbed to remove other desirable particles in a manner that is well known.

As can be understood in the foregoing description, the vehicle tire pieces are pyrolyzed while within the portion of rotary kiln 52 contained within the furnace 54. The rate of pyrolysis is controlled by the operating temperatures of the plurality of heating zones defined along the rotary kiln 52. Additionally, the rate of pyrolysis is also controlled by the rate at which the vehicle tire pieces in the product flow 61 traverse the rotary kiln 52 from the infeed end 58 to the discharge end 60. The rate of passage of the vehicle tire pieces through the rotary kiln 52 is controlled by the inclination of the rotary kiln 52 and the rate at which the rotary kiln 52 rotates.

In tests run utilizing the pyrolysis system 10 of the present invention having the plurality of individual heating zones each operated at distinct operating temperature, 100 tons of vehicle tire pieces generated, on average, 35 tons of carbon black and 11 tons of scrap steel. This result is a substantial increase over prior pyrolysis systems in which the pyrolysis process is undertaken at a constant temperature throughout the entire rotary kiln.

Figure 5:
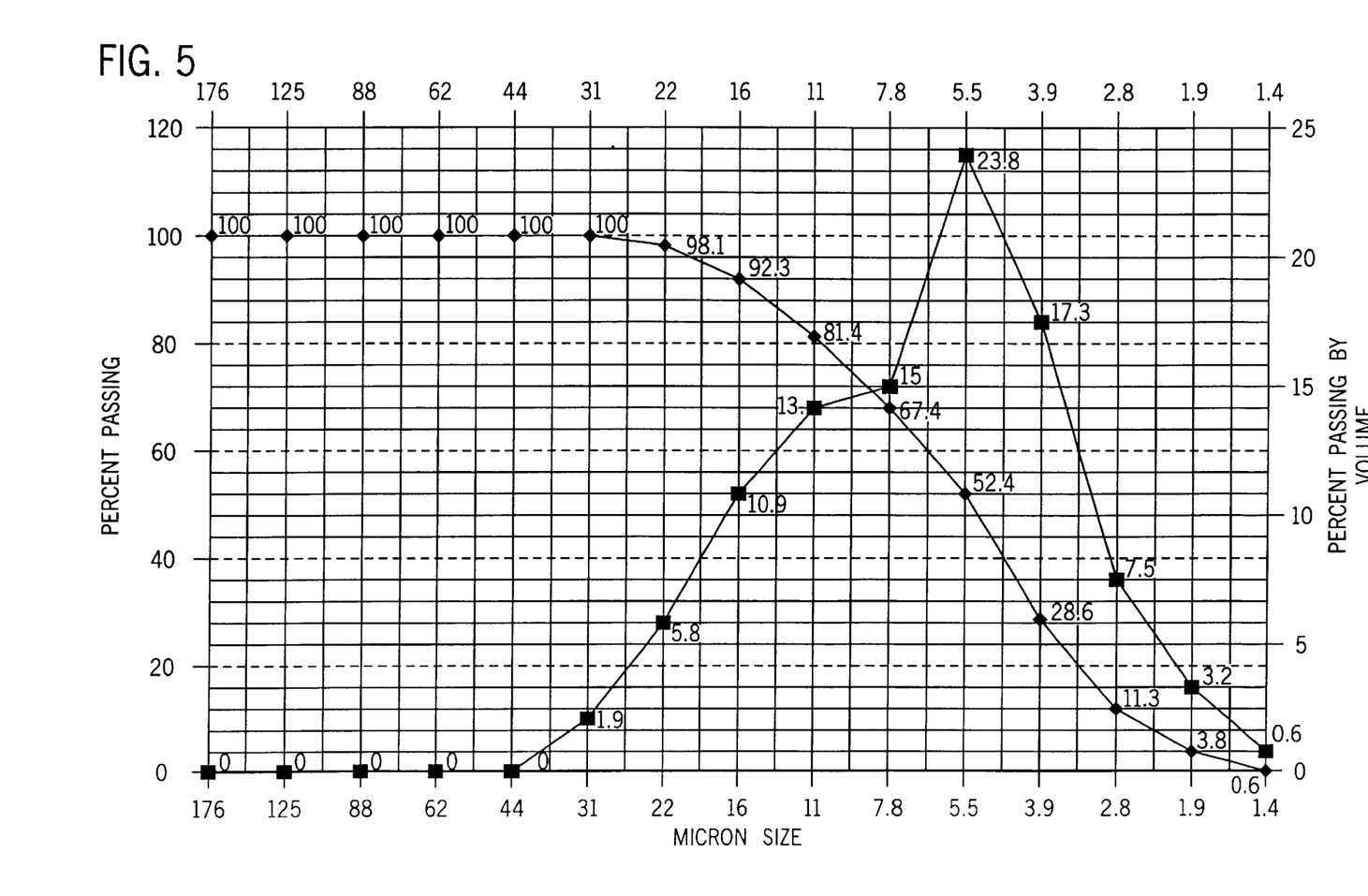
FIG. 5 is a size analysis chart for the carbon black produced by the pyrolysis system of the present invention.

In addition to producing a larger percent of carbon black from a given weight of vehicle tire pieces, the pyrolysis system 10 of the present invention produces a carbon black product that is of substantially higher quality than other prior pyrolysis systems currently available. FIG. 5 and the chart listed below indicate the results of tests run on carbon black produced by the pyrolysis system 10 of the present invention.

| CARBON CHAR ANALYSIS | | |
|---|---|---|
| | As Received | Dry Basis |
| Proximate Analysis | | |
| % Moisture | 0.74 | XXXXX |
| % Ash | 15.26 | 15.37 |
| % Volatile | 4.3 | 4.33 |
| % Fixed Carbon | 79.7 | 80.3 |
| | 100 | 100 |
| BTU/lb | 12429 | 12522 |
| % Sulfur | 2.8 | 2.9 |
| MAF BTU | | 14796 |
| Ultimate Analysis | | |
| % Moisture | 0.74 | XXXXX |
| % Carbon | 80 | 80.6 |
| % Hydrogen | 0.76 | 0.77 |
| % Nitrogen | 0.28 | 0.28 |
| % Sulfur | 2.88 | 2.9 |
| % Ash | 15.26 | 15.37 |
| % Oxygen | 0.08 | 0.08 |
| | 100 | 100 |

Various alternatives and embodiments are contemplated as being within the scope of the following claims particularly pointing out and distinctly claiming the subject matter regarded as the invention.

We claim:

1. A pyrolysis process for reclamation and recovery of desirable constituent materials from product pieces, the process comprising the steps of:

transferring the product pieces from a supply into a pyrolysis chamber;

heating the product pieces at a first temperature between 700°–800° C. in a first heating zone of the pyrolysis chamber;

transferring the product pieces from the first heating zone to a second heating zone in the pyrolysis chamber;

heating the product pieces at a second temperature between 600°–700° C. in the second heating zone, the second temperature being independent from the first temperature;

transferring the product pieces from the second heating zone to a third heating zone in the pyrolysis chamber;

heating the product pieces at a third temperature in the third heating zone, the third temperature being less than the second temperature; and removing the product pieces from the pyrolysis chamber and separating the desirable constituent materials.

2. The process of claim 1 wherein the third temperature is between 500° to 600° C.

3. The process of claim 1 wherein the product pieces are transferred into the pyrolysis chamber by rotating a feed cylinder having a flight formed along an inner wall of the feed cylinder such that rotation of the feed cylinder directs the product pieces from a first end to a second end of the feed cylinder.

4. The process of claim 1 wherein the step of separating the desirable materials includes:

receiving the removed product pieces in a rotating trommel having slots and trajectory diverters formed therein, the slots and diverters sized to allow char to pass therethrough while preventing passage of scrap steel particles; and collecting the char passed through the trommel and collecting the scrap steel in separate locations.

5. A pyrolysis process for reclamation and recovery of desirable constituent materials from vehicle tires shredded into tire pieces, the process comprising the steps of:

transferring the tire pieces into a rotary kiln having an infeed end and a discharge end, the rotary kiln having an open interior generally devoid of air and divided into three separate heating zones, a first heating zone being operated at a temperature between 700° C. to 800° C., a second heating zone being operated at a temperature between 600° C. to 700° C., and a third heating zone being operated at a temperature between 500° C. to 600° C.;

transferring the tire pieces through the three separate heating zones from the infeed end of the rotary kiln to the discharge end of the rotary kiln; such that the tire pieces are pyrolyzed as the tire Dieces traverse the rotary kiln;

removing the pyrolyzed tire pieces from the rotary kiln; and separating the pyrolyzed tire pieces into the desirable constituent materials.

6. The pyrolysis process of claim 5 wherein the tire pieces are transferred into the rotary kiln by a rotatable feed cylinder having a flight formed along an inside wall of the feed cylinder, the flight being constructed to direct the tire pieces from a first end of the feed cylinder to a second end of the feed cylinder as the feed cylinder rotates.

7. The pyrolysis process of claim 6 wherein the flight extends radially inward from the inside wall of the feed cylinder, the flight extending from the first end to the second end of the feed cylinder in a helical pattern.

8. The pyrolysis process of claim 5 wherein the step of separating the desirable constituent materials includes:

receiving the pyrolyzed tire pieces in a rotating trommel having slots and trajectory diverters formed therein, the slots and diverters sized to allow a first desirable constituent material to pass therethrough while preventing passage of a second desirable constituent material; and collecting the first desirable constituent material passed through the trommel in a first location and collecting the second desirable constituent material in a separate, second location.

9. A pyrolysis process for reclamation and recovery of desirable constituent materials from product pieces, the process comprising the steps of:

receiving the product pieces from a supply in a feed cylinder having a continuous flight attached to an inner wall of the feed cylinder and extending radially inward therefrom in a helical pattern from a first end of the feed cylinder to a second end of the feed cylinder;

rotating the feed cylinder such that the continuous flight extending from the inner wall of the feed cylinder moves the product pieces from the first end of the feed cylinder to the second end of the feed cylinder thereby transferring the product pieces from the supply to a pyrolysis chamber;

heating the product pieces at a first temperature between 700°–800° C. in a first heating zone of the pyrolysis chamber;

transferring the product pieces from the first heating zone to a second heating zone in the pyrolysis chamber;

heating the product pieces at a second temperature between 600°–700° C. in the second heating zone, the second temperature being independent from the first temperature;

transferring the product pieces from the second heating zone to a third heating zone in the pyrolysis chamber;

heating the product pieces at a third temperature between 500°–600° C. in the third heating zone, the third temperature being independent from the second temperature; and removing the product pieces from the pyrolysis chamber and separating the desirable materials.

10. The process of claim 9 wherein the pyrolysis chamber rotates to transport the product pieces through the pyrolysis chamber.

11. The process of claim 9 further comprising the step of extracting gases driven from the product pieces at a location near the second heating zone of the pyrolysis chamber.

12. The process of claim 11 wherein the step of extracting gases includes positioning a discharge tube within the pyrolysis chamber, the discharge tube having a first end positioned near the second heating zone and a second end coupled to a source of negative pressure, such that the negative pressure draws the gases out of the pyrolysis chamber.

13. A pyrolysis system for reclamation and recovery of desirable materials from vehicle tires, the system comprising:

a feed chamber directing a supply of vehicle tire pieces;

an infeed device positioned to transport the supply of vehicle tire pieces from the feed chamber;

a pyrolysis section generally devoid of air and having an infeed end and a discharge end, the infeed end positioned to receive the vehicle tire pieces from the infeed device, the pyrolysis section being divided into three heating zones to heat the vehicle tire pieces as the tire pieces move through the pyrolysis section wherein an operating temperature of a first heating zone is between 700° C. to 800° C., an operating temperature of a second heating zone is between 600° C. to 700° C., and an operating temperature of a third heating zone is between 500° C. to 600° C., wherein the vehicle tire pieces are pyrolyzed while traversing the pyrolysis section from the infeed end to the discharge end; and a separating device positioned adjacent to the pyrolysis section to separate the desirable materials.

14. The system of claim 13 wherein the pyrolysis section includes a rotary kiln having an infeed end and a discharge end, the rotary kiln being divided into the three heating zones.

15. The system of claim 14 wherein the pyrolysis section further includes a plurality of individual burner assemblies, each burner assembly being associated with one of the three heating zones and being independently controllable to create the distinct operating temperature for the respective heating zone.

16. The pyrolysis system of claim 13 wherein the infeed device comprises a rotatable feed cylinder having a first end coupled to the feed chamber and a second end coupled to the pyrolysis section, the feed cylinder having a continuous flight extending radially inward from an inner wall of the feed cylinder, the flight constructed to direct the vehicle tire pieces from the first end to the second end of the feed cylinder as the feed cylinder rotates.

17. The pyrolysis system of claim 16 wherein the flight extends radially inward from the inner wall of the feed cylinder, the flight extending from the first end of the feed cylinder to the second end of the feed cylinder in a helical pattern.

18. The pyrolysis system of claim 13 wherein the separating device comprises a rotatable trommel coupled to the discharge end of the pyrolysis section, the trommel having a plurality of slots spaced along its outer circumference, the slots being sized to permit passage of a first desirable material therethrough while preventing passage of a second desirable material.

19. The pyrolysis system of claim 18 further comprising a trajectory diverter positioned adjacent to each slot formed in the outer circumference of the trommel, the trajectory diverter positioned to divert the second desirable material from the slot positioned adjacent thereto as the trommel rotates.

20. The pyrolysis system of claim 13 further comprising a gas discharge tube having a first end positioned within the pyrolysis section and a second end coupled to a source of negative pressure, such that the negative pressure applied to the discharge tube draws gases out of the pyrolysis section from a location spaced from the discharge end.

21. A pyrolysis system for the reclamation and recovery of char and scrap steel from vehicle tire pieces, the system comprising:
 a feed chamber directing a supply of the vehicle tire pieces;
 a rotatable feed cylinder extending between a first end and a second end, the first end of the feed cylinder being coupled to the feed chamber, the feed cylinder having a continuous flight extending radially inward from an inner wall of the feed cylinder and extending in a helical pattern between the first end and the second end of the feed cylinder, the flight constructed to direct the vehicle tire pieces from the first end to the second end of the feed cylinder;
 a rotary kiln having an infeed end and a discharge end, the infeed end positioned to receive the vehicle tire pieces from the feed cylinder, the rotary kiln being divided into three heating zones to heat the vehicle tire pieces as the tire pieces move through the rotary kiln, wherein the operating temperature of a first heating zone is between 700° C. to 800° C., the operating temperature of a second heating zone is between 600° C. to 700° C. and the operating temperature of a third heating zone is between 500° C. to 600° C., wherein the vehicle tire pieces are pyrolyzed as the tire pieces pass through the rotary kiln from the infeed end to the discharge end; and
 a rotatable trommel coupled to the discharge end of the pyrolysis section, the trommel constructed to separate the char from the scrap steel.

22. The pyrolysis system of claim 21 wherein the feed cylinder is coupled to the rotary kiln for rotation with the rotary kiln.

23. The pyrolysis system of claim 21 wherein the rotatable trommel includes a plurality of slots spaced along its outer circumference and a plurality of trajectory diverters each positioned adjacent to one of the slots formed in the outer circumference, the slots being sized to permit passage of char therethrough while preventing passage of steel scrap through the slots.

24. The pyrolysis system of claim 21 wherein the rotary kiln includes a plurality of individual burner assemblies, each burner assembly being associated with one of the three heating zones and being independently controllable to create the distinct operating temperature for the respective heating zone.

* * * * *

UNITED STATES PATENT AND TRADEMARK OFFICE
CERTIFICATE OF CORRECTION

PATENT NO. : 6,221,329 B1
DATED : April, 24, 2001
INVENTOR(S) : Bobby P. Faulkner, Robert J. Unterweger, Roy W. Hansen Page 1 of 1

It is certified that error appears in the above-identified patent and that said Letters Patent is hereby corrected as shown below:

Claim 5, Column 11,
Line 22, delete "Dieces" and substitute therefor -- pieces --.

Signed and Sealed this

Eighteenth Day of September, 2001

*Attest:*

*Attesting Officer*

NICHOLAS P. GODICI
*Acting Director of the United States Patent and Trademark Office*